Dec. 29, 1964   F. KUGEL ETAL   3,163,126
INTERNAL COMBUSTION ENGINE DRIVEN RAIL VEHICLE
Filed Feb. 7, 1962   2 Sheets-Sheet 1

INVENTORS:
Fritz Kugel
Manfred Schrag
BY

Dec. 29, 1964   F. KUGEL ETAL   3,163,126
INTERNAL COMBUSTION ENGINE DRIVEN RAIL VEHICLE
Filed Feb. 7, 1962   2 Sheets-Sheet 2
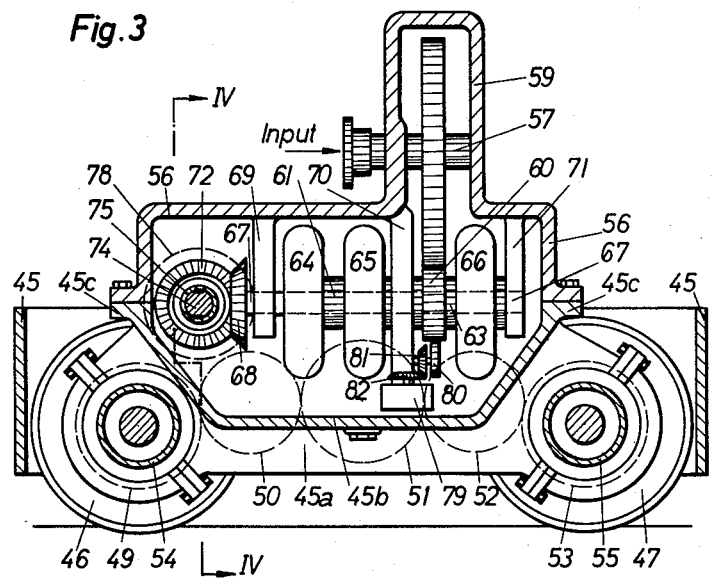
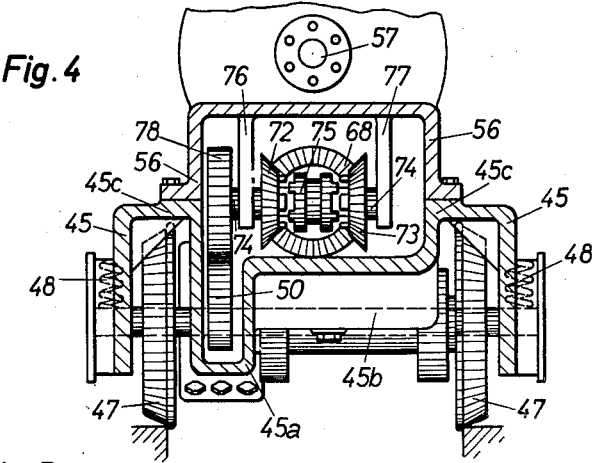
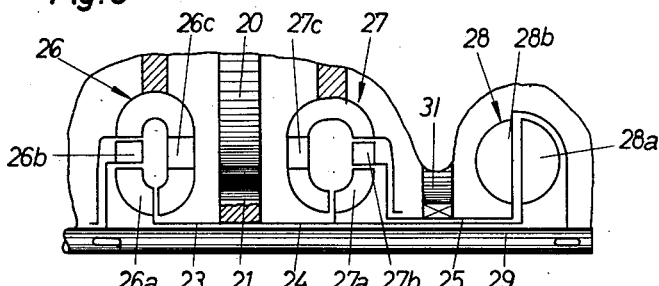
INVENTORS:
Fritz Kugel
Manfred Schrag
BY

United States Patent Office 3,163,126
Patented Dec. 29, 1964

3,163,126
INTERNAL COMBUSTION ENGINE DRIVEN
RAIL VEHICLE
Fritz Kugel and Manfred Schrag, Heidenheim (Brenz),
Germany, assignors to Voith-Getriebe KG., Heidenheim (Brenz), Germany
Filed Feb. 7, 1962, Ser. No. 171,743
Claims priority, application Germany, Feb. 11, 1961,
V 20,138
10 Claims. (Cl. 105—96.2)

The present invention relates to an internal combustion engine driven rail vehicle in which two adjacent driving wheel sets are driven through the intervention of a fluid flow transmission with variable transmission ratio, which transmission is interposed between said two adjacent driving wheel sets. Although not limited to, the present invention is particularly useful in connection with a self-propelled rail vehicle with high driving power, especially such self-propelled vehicles with trucks.

According to a heretofore known design, the transmission arranged between the driving wheel sets is combined with the two adjacent axle drives to a rigid structural unit, and this transmission unit is cushioned relative to the driving axles. In this way, it has been made possible without difficulties to mount fluid flow transmissions with a plurality of flow circuits as for instance torque converters or fluid couplings, in the truck or main frame of a vehicle between two adjacent driving axles and more specifically at only short distance between the axles and with a minimum of non-cushioned parts.

It is an object of the present invention further to improve the arrangement just described.

It is a further object of this invention to provide an internal combustion engine driven rail vehicle with a fluid flow transmission interposed between two adjacent drive wheel sets, which will permit a quick, simple and thorough check of all essential elements of the fluid flow transmission and the transmission parts following the same without necessitating a disassembly or removal of a great number of parts of the vehicle drive.

It is another object of this invention to provide a rail vehicle of the type set forth in the preceding paragraph, which will permit a lighter construction of the housing for the fluid flow transmission.

These and other objects and advantages of the invention will appear more clearly from the following specification in connection with the accompanying drawings, in which:

FIG. 3 is a longitudinal section through a truck with a three-velocity fluid flow transmission arranged parallel to the longitudinal direction of the vehicle.

FIG. 4 is a cross section through the truck of FIG. 3, said section being taken along the line IV—IV of FIG. 3.

FIG. 5 is a fragmentary sectional view showing details of the fluid flow circuits of FIGS. 1 and 2.

General Arrangement

Figure 1:
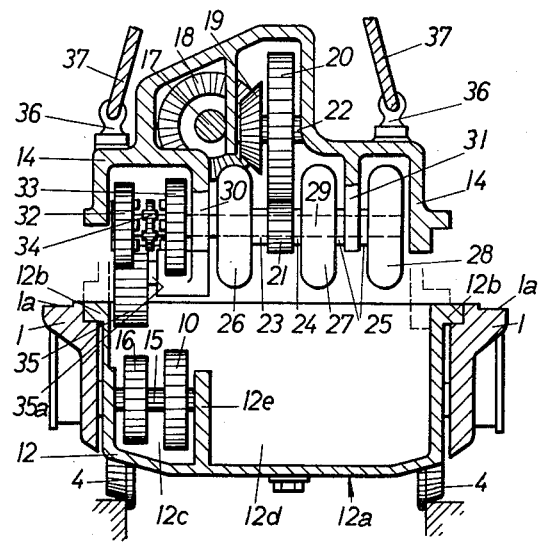
FIG. 1 is a diagrammatic cross section through the main frame of a self-propelled vehicle with the lifted-off upper portion of a fluid flow transmission, said section being taken along the line I—I of FIG. 2.

With reference to an arrangement of the above mentioned type with a flow transmission the housing of which additionally consists of an upper part and a lower part, the improvement thereof according to the present invention consists in that at least the input of said fluid flow transmission and the fluid circuits thereof as well as the filling pump and preferably also the control device for the circuits are journalled on or connected to the upper part of the fluid transmission housing and are so designed that they can be removed together with the upper part from the lower part of the fluid flow transmission housing, whereas at least a portion of a gear transmission behind the fluid flow transmission is journalled in the lower part of the housing. Furthermore, the lower part serves as supporting component of the transmission unit. Such an arrangement of the fluid flow transmission housing permits a fast, simple and thorough checking over all essential elements of the fluid flow transmission and the transmission elements behind the same without necessitating a cumbersome disassembly of a number of parts of the vehicle drive. More specifically, it is merely necessary to loosen the connection between upper part and lower part and the drive in order to be able to remove the upper part with the most important elements of the fluid flow transmission. If this is done, the corresponding transmission members in the upper part as well as in the lower part are open to easy inspection. If desired, the lifted-off upper part may immediately be removed for repairing.

A further advantage of the transmission design according to the present invention consists in that the upper part of the fluid flow transmission housing does not any longer form one of the supporting elements of the transmission unit. Consequently, the upper part has to be dimensioned merely for the forces which occur with the transmission members connected to the upper part, whereas the construction of the lower part with regard to its strength will depend substantially on the forces which occur at the driving axles and gears and therebetween. For calculating the strength of the upper part on one hand and the transmission unit connected with the lower part on the other hand, this separation of the forces will constitute a considerable simplification.

The driving connection between the transmission elements in the upper and lower part of the housing will, in conformity with a further development of the invention, be effected by having at least one gear, which in assembled condition of the upper and lower housing parts is journalled in the upper part, mesh with a gear journalled in the lower part. These gears are so arranged that the upper part can be lifted off without the removal of gears from the lower part. Thus, the removal of the upper part from the lower part can be effected in a particularly simple manner. It is merely necessary to loosen the screws by means of which the upper part is connected to the lower part and to disconnect the control conduits of the fluid flow transmission and the drive (for instance through a Cardan shaft) in order to be able to lift off the upper part. Any cumbersome disassembly within the transmission housing, for instance of gears will thus be completely avoided.

According to a further feature of the invention, the lower part of the fluid flow transmission housing is so designed that the lower part serves not only as supporting component of the transmission unit, but said lower part, especially the walls of its oil sump, serve at the same time as supporting element of the vehicle main frame or truck frame. This brings about a considerable saving in weight, especially when in addition thereto the oil sump of the flow transmission is formed by the supporting walls of the vehicle frame so that a separate oil sump container will be superfluous. In this way, a particularly advantageous construction will be obtained.

A further development of the present invention aims at connecting the lower part of the fluid flow transmission housing directly to the vehicle main frame or the truck frame, and further at designing the transmission unit so that the latter together with the lower part of the flow transmission housing can be removed from the vehicle main frame or the truck frame. In this connection, advantageously the housing portions of the transmission unit, which portions surround the driving axles, are spread so that not only the upper part but also the lower part may be removed from the frame. In this way, in addition to the transmission parts of the upper and lower part, also the transmission elements on the driving axles such as pinion and hollow Cardan shaft will be better and easier accessible.

It is also possible so to design the lower part of the transmission housing that it forms the supporting transverse connection of the two lateral longitudinal beams of the frame so that additional transverse beams will become superfluous.

*Structural Arrangement*

Figure 2:
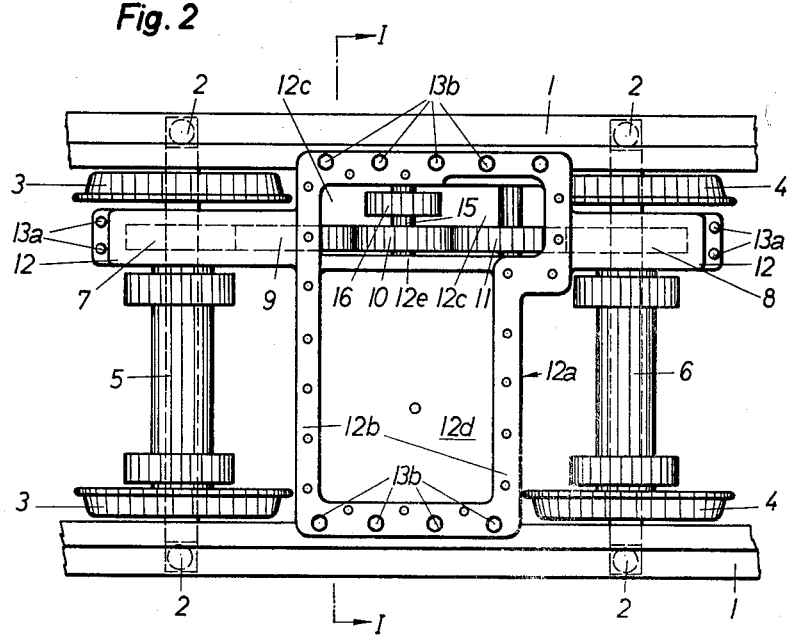
FIG. 2 is a top view of two adjacent driving axles arranged in the main frame of FIG. 1, with the interposed lower portion of the lifted-off flow transmission.

Referring now to the drawings in detail, FIGS. 1 and 2 illustrate a portion of a main frame 1 of a self-propelled vehicle. The main frame 1, which is provided with a connecting flange 1a to which the vehicle frame may be screwed, rests by means of springs 2 on the driving axles of the drive wheel sets 3 and 4. The driving axles are driven through the intervention of hollow Cardan shafts 5 and 6 the joints of which on the output side are respectively connected with a wheel disc of the driving wheel sets 3 and 4. The drive of the hollow cardan shafts is effected by means of a spur gear 7 and 8. Both spur gears 7 and 8 pertain to a spur gear train together with further spur gears 9, 10 and 11 meshing with each other and journalled in a transmission unit 12. The transmission unit 12 is connected to the main frame 1 by means of screws 13b so that the bearings of the spur gears 7 to 11 are in rigid connection with the main frame 1, whereas the joints of the hollow Cardan shafts on the output side are permitted together with the driving wheel sets 3 and 4 to displace themselves in vertical direction with regard to the main frame. The disengageable housing parts of the transmission unit below the spur gears 7 and 8 are by means of screws 13a connected to the housing part above said spur gears and thus permit a convenient lifting off of the transmission unit 12 from frame 1.

In the central portion of the transmission unit 12 there is arranged as a part of said transmission unit the lower part 12a of a fluid flow transmission housing. The upper marginal portion of this housing has a flange 12b for receiving the upper part 14 of the fluid flow transmission housing and furthermore has two oil chambers 12c and 12d separated by a partition 12e. The oil chamber 12c represents a portion of the oil sump which extends below the spur gear train 7 to 11 and into which the gears 7 and 11 immerse for purposes of lubrication. The oil chamber 12d is associated with the fluid flow transmission. A further spur gear 16 immerses in the oil sump part 12c. This gear 16 is together with spur gear 10 mounted on a shaft 15.

The upper part 14, which in FIG. 1 is shown in lifted-off position with regard to the lower part 12a, may be connected by means of screws to flange 12b of the lower part 12a. The upper part 14 has in addition to the fluid flow transmission an input with a shaft 17, a bevel gear pair 18, 19 and a spur gear pair 20, 21 (high velocity) while the bevel gear 19 and the spur gear 20 are both mounted on a shaft 22. The spur gear 21 is by means of hollow shafts 23 and 24 connected to the primary wheels of three fluid flow circuits 26, 27 and 28 which yield the three velocity ranges of the vehicle. In FIGS. 5, the fluid flow circuits 26 and 27 have pump wheels 26a and 27a, turbine wheels 26b and 27b and stationary guide wheels 26c and 27c. The fluid flow circuit 28 is a fluid flow clutch with a pump wheel 28a and a turbine wheel 28b. Pump wheels 26a, 27a and 28a are connected to the driven hollow shaft 23, 24. The turbine wheels 26b and 28b are rigidly connected to the central shaft 29 whereas the turbine wheels 27b and 28b are interconnected through the intervention of a further hollow shaft 25.

The hollow shaft 25 is journalled in a housing web 31 at the upper part 14. The central shaft 29 is journalled in part in the above mentioned hollow shafts and in part in a further housing web 30. On one end of shaft 29 there are loosely rotatably journalled two spur gears 32 and 33 which by means of a jaw clutch 34 may selectively be drivingly connected to shaft 29. Spur gear 32 meshes with a further spur gear 35 the shaft 35a of which is likewise journalled in housing web 30. When the upper part 14 and lower part 12a are in assembled condition, the two spur gears 35 and 33 mesh with the spur gears 16 and 10 respectively which are journalled in the lower part so that, depending on the position of the jaw clutch 34, the driving axles drive the vehicle either forwardly or rearwardly.

Inasmuch as the housing webs or ribs 30 and 31 have been cast to the upper part 14 of the fluid flow transmission housing, it will be evident that when lifting off the upper part 14 from the lower part 12a, for instance by means of a rope 37 passed through ring screws 36 connected to the upper part, the input 17–22 and also the fluid flow circuits 26–28 together with the parts pertaining thereto and even the major portion of the change gear transmission following the fluid transmission namely parts 32 to 35 thereof can be lifted off together with the upper part and will thus easily be accessible. The fact that most of the gears of the change gear transmission are journalled in the upper part and can be lifted off together with the same is of particular importance for the accessibility of the transmission parts because the gears can be checked better not only at the upper part than at the lower part but they will also not interfere with the view in the lower part. Moreover, the manufacture can be considerably simplified inasmuch as the bores in the upper and lower part can be machined separately. When removing the upper part, the gear mesh between gears 10 and 33 and 16 and 35 is interrupted. Moreover, also the parts of the gear train 7–11 in the lower part, as well as the spur gear 16 and the two oil chambers 12c and 12d are now fully open for inspection. The fluid flow transmission arranged transverse to the longitudinal direction of the vehicle, i.e. parallel to the driving axles, and the spur gear train between the driving axles make possible the employment of a simple change gear transmission which consists of spur gears only.

It should furthermore be noted that after loosening the screws 13a and 13b, also the transmission unit 12 may be removed from the main frame so that further transmission parts will now easily be accessible. More specifically, the driving wheel sets together with the spur gears 7 and 8 and the hollow Cardan shafts 5 and 6 will now be easily accessible.

The lower part of the transmission unit 12 furthermore serves to connect the lateral walls of the main frame 1 to each other so that in the range between the illustrated driving wheel sets, any further connection between the side walls of the main frame will be superfluous. The oil sump, which at the lower portion and at its longitudinal sides is surrounded exclusively by supporting walls, will thus be obtained practically without additional structural elements. In order to prevent spray oil at the seals between transmission housing and shafts from passing toward the outside, it is advantageous as far as possible to employ a relatively thick oil for lubricating the gears, whereas in the fluid transmission a relatively thin oil is employed for purposes of improving the degree of efficiency of the fluid flow transmission. The two oil chambers 12c and 12d expediently separated from each other by partition 12e and housing web or rib 30 permit the employment of two different types of oils namely thin liquid oil particularly suitable for hydraulic drives and a thick liquid lubricating oil for the spur gears.

FIGS. 3 and 4 illustrate a further embodiment and show a truck with two driving wheel sets and a three-velocity fluid flow transmission which is parallel to the longitudinal direction of the truck. The truck frame 45, which in this instance also comprises the lower part 45b of the transmission unit 45a, which lower part forms the oil sump for the fluid flow transmission, is supported with regard to the two driving wheel sets 46 and 47 by means of springs 48. The transmission unit 45a has a spur gear train consisting of spur gears 49 to 53 and interconnecting the driving axles so that the spur gears 49 and 53 are connected with one driving wheel each through hollow Cardan shafts 54 and 55 in a manner similar to that of FIG. 1.

The lower part 45b with the oil sump has a flange 45c onto which the upper part 56 of the fluid flow transmission housing is screwed. The upper part 56 which merely for the sake of clarity has been shown in FIG. 3 as a single part, comprises the input, the fluid flow transmission with filling pump, and the change gear transmission following the fluid flow transmission. The input has an input shaft 57 having a spur gear 59 mounted thereon and also comprises a spur gear 60 meshing with spur gear 59. This high velocity range comprising spur gears 59 and 60 will, similar to FIG. 2, drive the primary wheels of three fluid flow circuits 64, 65 and 66 through the intervention of hollow shafts 62 and 63. The secondary wheels of the fluid flow circuits 64 and 65 are connected to a central shaft 67 to one end of which a bevel gear 68 is connected whereas the secondary wheels of the fluid flow circuits 64 and 65 are interconnected through the intervention of a further hollow shaft 61. The journalling of the hollow shaft 62, 63 and shaft 67 is effected in housing webs or ribs 69 to 71 of the upper part 56. The bevel gear 68 meshes with two further bevel gears 72 and 73 which are loosely rotatably mounted on shaft 74 and are adapted by means of a jaw clutch 75 firmly to be connected selectively with shaft 74. Shaft 74 is likewise journalled in housing webs or ribs 76 and 77 of the upper part 56 and furthermore has mounted thereon a spur gear 78 which, when the upper and lower parts are in assembled condition, meshes with spur gear 50 of the spur gear train, whereas it disengages the spur gear 50 when the upper part 56 is lifted off.

Spur gear 60 furthermore drives a filling pump 79 through the intervention of a spur gear 80 and a bevel gear pair 81, 82. Filling pump 79 is connected to the housing webs or ribs 70.

With the above mentioned design of the upper part 56 in conformity with FIGS. 3 and 4, also the input 57–61, the fluid flow circuits 64–66, the filling pump thereof and drive 79 to 82 and the entire reversing transmission 68 and 72–75 can together with the upper part be lifted off so that not only these parts but also the oil sump of the fluid flow transmission and the spur gear train 49–53 are easily accessible. The driving connection between the upper part 56 and lower part 45a will with this design have a single spur gear pair 50, 78 only. A particular advantage of this transmission design consists in that with the reversing transmission having bevel gears, all gears are journalled in the upper part and similar to all transmission elements of these upper parts will be particularly well accessible.

It is, of course, to be understood that the present invention is, by no means, limited to the particular constructions shown in the drawings but also comprises any modifications within the scope of the appended claims.

What we claim is:

1. An internal combustion engine operable self-propelled rail vehicle, which comprises in combination: drive wheel sets arranged adjacent to each other, each of said drive wheel sets including axle means and drive transmitting means, fluid flow transmission means having a variable transmission ratio and being interposed between and drivingly connected to said drive wheel sets, said fluid flow transmission means including input means and fluid flow circuit means and fluid pump means, said fluid flow transmission means and said drive transmitting means forming a structural unit with each other, spring means supported by said axle means, said structural unit including a sectional housing having a lower housing section supported by said spring means and an upper housing section supported on and detachably connected to said lower housing section, said upper housing section having supporting and bearing means supporting said input means and said fluid flow transmission means and said fluid pump means and a gear transmission arranged behind said fluid flow transmission means when looking in the direction of the power flow from said input means to said fluid flow transmission means, at least one element of said gear transmission being journalled in said lower housing section and being disconnectable from said fluid flow transmission means in said upper housing section by upward movement of said upper housing section and said fluid flow transmission means from said lower housing section.

2. A self-propelled rail vehicle according to claim 1, which includes control means for said fluid flow circuit means, said control means also being supported by said upper housing section.

3. A self-propelled rail vehicle according to claim 1, in which said gear transmission includes at least one gear journalled in said lower housing section and at least one gear journalled in said upper housing section and meshing with said gear journalled in said lower housing section when said housing sections are in assembled position, said gears in said lower and upper housing sections being movable out of mesh and into mesh by merely lifting said upper housing section off and placing the upper housing section on said lower housing section respectively.

4. An internal combustion engine operable self-propelled rail vehicle, which comprises in combination: drive wheel sets arranged adjacent to each other, each of said drive wheel sets including axle means and drive transmitting means, fluid flow transmission means having a variable transmission ratio and being interposed between and drivingly connected to said drive wheel sets, said fluid flow transmission means including input means and fluid flow circuit means and fluid pump means, a main frame, spring means supported by said axle means and yieldably supporting said main frame, said fluid flow transmission means and said drive transmitting means forming a structural unit with each other, said structural unit including a sectional housing having a lower housing section supported by said spring means and confining an oil sump and also having an upper housing section supported on and detachably connected to said lower housing section, said lower housing section forming supporting components of said main frame, said upper housing section having supporting and bearing means supporting said input means and said fluid flow transmission means including said fluid pump means and being adapted together with the latter to be lifted off said lower housing section, and a gear transmission arranged behind said fluid flow transmission means when looking in the direction of the power flow from said input means to said fluid flow transmission means, at least one element of said gear transmission being journalled in said lower housing section and being disconnectable from said fluid flow transmission means in said upper housing section by upward movement of said upper housing section and said fluid flow transmission means from said lower housing section.

5. An internal combustion engine operable self-propelled rail vehicle, which comprises in combination: truck means, drive wheels sets arranged adjacent to each other and supported by said truck means, each of said drive wheel sets including axle means and drive transmitting means, fluid flow transmission means having a variable transmission ratio and being interposed between and drivingly connected to said drive wheel sets, said fluid flow transmission means including input means and fluid flow circuit means and fluid pump means, said fluid flow transmission means and said drive transmitting means forming a structural unit with each other, yieldable means supported by said axle means, said structural unit including a sectional housing having a lower housing section supported by said yieldable means and confining an oil sump and also having an upper housing section supported on and detachably connected to said lower housing section, said lower housing section including wall portions forming supporting parts for said truck means, said upper housing section having supporting and bearing means supporting said input means and said fluid flow transmission means and said fluid pump means and being adapted together with the latter to be lifted off said lower housing section, and a gear transmission arranged behind said fluid flow transmission means when looking in the direction of the power flow from said input means to said fluid flow transmission means, at least one element of said gear transmission being journalled in said lower housing section and being disconnectable from said fluid flow transmission means in said upper housing section by upward movement of said upper housing section and said fluid flow transmission means from said lower housing section.

6. A self-propelled rail vehicle according to claim 4, in which said lower housing section is detachably connected to said main frame, and in which said structural unit is detachably connected to said main frame.

7. A self-propelled rail vehicle according to claim 5, in which said lower housing section is detachably connected to said truck means, and in which said structural unit is detachably connected to said truck means.

8. An internal combustion engine operable self-propelled rail vehicle, which comprises in combination: drive wheel sets arranged adjacent to each other, each of said drive wheel sets including axle means and drive transmitting means, fluid flow transmission means having a variable transmission ratio and being interposed between and drivingly connected to said drive wheel sets, said fluid flow transmission means including input means and fluid flow circuit means and fluid pump means, reversing gear means arranged behind said fluid flow transmission means when looking in the direction of power flow from said input means to said fluid flow circuit means, said fluid flow transmission means and said drive transmitting means and said reversing gear means forming a structural unit with each other, spring means supported by said axle means, said structural unit including a sectional housing having a lower housing section supported by said spring means and an upper housing section supported on and detachably connected to said lower housing section, said upper housing section having supporting and bearing means supporting said input means and said fluid flow circuit means and said fluid pump means as well as at least the major portion of said reversing gear means and being adapted together with the latter to be lifted off said lower housing section, and a gear transmission arranged behind said fluid flow transmission means when looking in the direction of the power flow from said input means to said fluid flow transmission means, at least one element of said gear transmission being journalled in said lower housing section and being disconnectable from said fluid flow transmission means in said upper housing section by upward movement of said upper housing section and said fluid flow transmission means from said lower housing section.

9. A self-propelled rail vehicle according to claim 8, in which said reversing gear means comprises spur gears at least one of which is rotatably journalled in said lower housing section while other spur gears of said reversing gear means are rotatably journalled in said upper housing section, said spur gear in said lower housing section meshing with at least one of said spur gears in said upper housing section when said upper and lower housing sections are in assembled position.

10. A self-propelled rail vehicle according to claim 8, in which said reversing gear means includes bevel gears and an output shaft and has a spur gear mounted on said output shaft, said last mentioned spur gear meshing with the spur gear in said lower housing section when said lower and upper housing sections are in assembled condition.

References Cited in the file of this patent

UNITED STATES PATENTS

| | | |
|---|---|---|
| 2,131,531 | Behrens | Sept. 27, 1938 |
| 2,225,713 | Rodler | Dec. 24, 1940 |
| 2,276,848 | Kjolseth | Mar. 17, 1942 |
| 2,839,011 | Kugel | June 17, 1958 |

FOREIGN PATENTS

| | | |
|---|---|---|
| 1,199,256 | France | June 22, 1956 |
| 1,251,261 | France | Dec. 12, 1960 |